United States Patent [19]

St. Amand

[11] 3,730,158

[45] May 1, 1973

[54] CANISTER FOR EVAPORATION LOSS CONTROL

[75] Inventor: James C. St. Amand, Spencerport, N.Y.

[73] Assignee: General Motors Corporation, Detroit, Mich.

[22] Filed: July 28, 1971

[21] Appl. No.: 166,714

[52] U.S. Cl. ................................................ 123/136
[51] Int. Cl. ............................................. F02m 25/00
[58] Field of Search ...................................... 123/136

[56] References Cited

UNITED STATES PATENTS

| | | | |
|---|---|---|---|
| 3,628,517 | 12/1971 | Soberski | 123/136 |
| 3,646,731 | 3/1972 | Hansen | 123/136 |
| 3,039,485 | 6/1962 | Brohl | 123/136 |
| 3,191,587 | 6/1965 | Hall | 123/136 |

OTHER PUBLICATIONS

An Adsorption–Regeneration Approach to the Problem of Evaporative Control. (SAE Report Jan. 9, 1967)

Primary Examiner—Laurence M. Goodridge
Assistant Examiner—Cort Flint
Attorney—J. L. Carpenter et al.

[57] ABSTRACT

A canister for controlling the loss of fuel vapor from a vehicle fuel tank includes a downwardly opening adsorption chamber which is fluidly connected in an evaporative flow path between the fuel tank and the induction passage of the vehicle engine. A pair of coaxially disposed, discardable cartridges are releasably retained in the adsorption chamber, the cartridges being resiliently separated within the chamber by an intermediate vapor distributing and filtering pad. Each cartridge includes a hollow core around which an activated charcoal filled sheet is wrapped to form a filtering element conforming to the shape of the chamber. Fuel vapor from the fuel tank flows downwardly through the core of the upper or anti-surge cartridge to the distributing and filtering pad which radially spreads the flow for downward dispersion into the lower or storage cartridge. During engine operation, the stored fuel vapor is initially drawn upwardly from the storage cartridge to the anti-surge cartridge and dispersed therewithin to prevent surging as fuel vapor is purged from the canister to the induction passage.

3 Claims, 4 Drawing Figures

Patented May 1, 1973
3,730,158
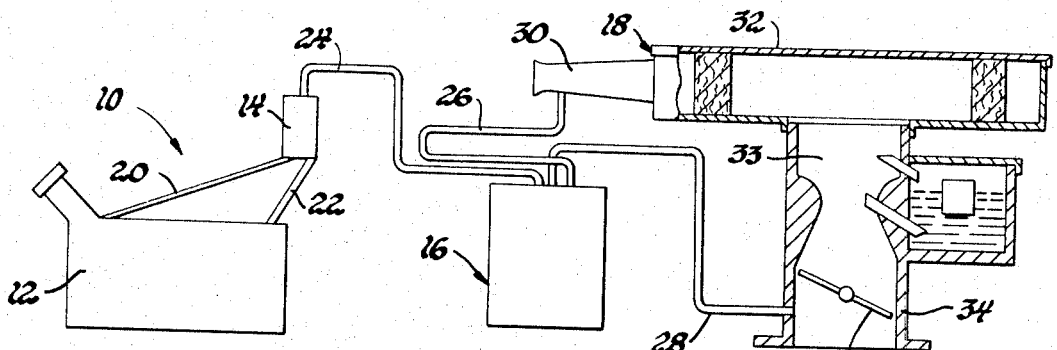
Fig.1
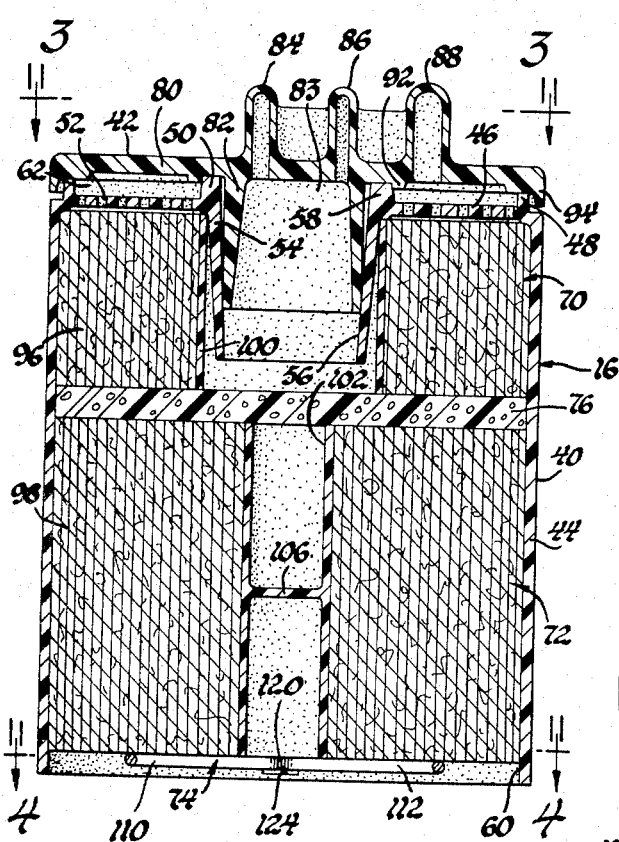
Fig.2
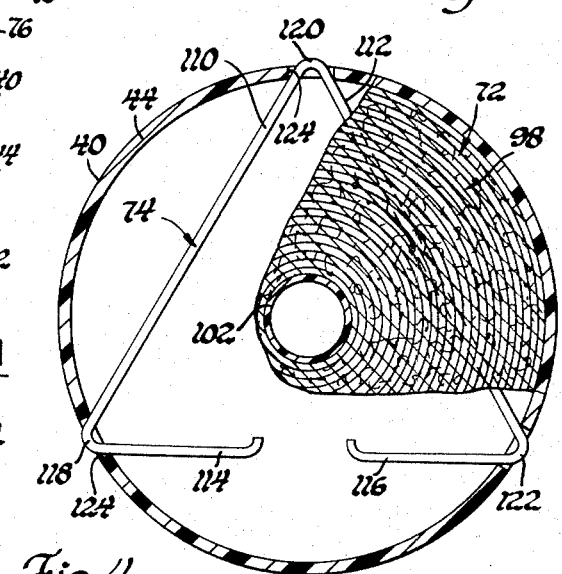
Fig.3
Fig.4
INVENTOR.
James C. St.Amand
BY
Peter D. Sachtjen
ATTORNEY

CANISTER FOR EVAPORATION LOSS CONTROL

The present invention relates to fuel vapor adsorptive devices for evaporation loss control systems and, in particular, to a fuel vapor adsorbing canister for use in controlling the loss of fuel vapor from a motor vehicle fuel tank.

Currently most motor vehicles are provided with a system for controlling the loss of fuel vapor from the vehicle fuel tank. The system generally includes a canister which is positioned in the engine compartment. The canister contains a vapor adsorbing media such as activated charcoal and, by means of conduits, the media is serially connected in flow path between the fuel tank and the engine air induction system. With this arrangement, fuel vapor emitted from the fuel tank is directed through the media and, during vehicle operation, the stored fuel vapor is purged therefrom into the engine induction system.

The present invention provides a canister adaptable for use in such a system that incorporates discardable vapor adsorbing cartridges which are releasably retained in a downwardly opening adsorption chamber. Each cartridge comprises a hollow central core around which a carbon-filled paper sheet is wrapped to form a cylindrical cartridge roll which conforms in shape to the adsorption chamber. The carbon-filled paper comprises up to 70 percent finely grained activated charcoal by volume and has a capacity for holding greater amounts of liquified vapor than conventional granulated charcoal or carbon. The cartridges are resiliently separated by a vapor distributing pad which receives the vapor from the tank through the core of the upper cartridge. The pad radially distributes the vapor for downward dispersion to the lower cartridge. During vehicle operation, air is drawn through the cartridges and the stored fuel vapor is purged upwardly to the upper cartridge and temporarily dispersed therewithin to prevent vapor surge and permit a gradual metering of vapor into the induction systems. Upon degrading or at the recommended intervals, the spent cartridges are easily removed by the release of a single spring retaining member without disconnecting or discarding the canister.

These and other features of the present invention will be apparent to one skilled in the art upon reading the following detailed description, reference being made to the accompanying drawings showing a preferred embodiment in which:

FIG. 1 is a schematic diagram of an evaporative loss control system incorporating a fuel adsorbing canister made in accordance to the present invention;

FIG. 2 is an enlarged side cross sectional view showing the construction of the canister;

FIG. 3 is a view taken along line 3—3 of FIG. 2 with parts broken away showing the inlet and purge filtering grid structure and of the canister; and FIG. 4 is a view taken along line 4—4 of FIG. 2 with parts broken away showing the retaining spring holding the cartridges in the canister.

Referring to the drawings, there is shown an evaporative loss control system 10 for controlling a loss of fuel vapor from a fuel reservoir in a motor vehicle. More particularly, the system 10 comprises a fuel tank 12, a liquid-vapor separator 14, and a vapor adsorbing canister 16. The fuel tank 12, the separator 14, and the canister 16 are serially fluidly connected to the air induction system 18 of the vehicle engine. Fuel vapor emitted from the tank 12 passes through vent conduits 20 and 22 to the liquid-vapor separator 14 which is conventional in construction. The separator 14 returns any liquid droplets to the fuel tank 12 and routes the remaining vapor to the inlet of the canister 16 through a conduit 24. The canister 16 includes a pair of outlet conduits 26 and 28 which are respectively connected in parallel to the air induction system at the snorkel 30 of the engine air cleaner 32 and the induction passage 33 of the carburetor 34 at a point downstream of the throttle plate 36. In a manner hereinafter described, the fuel vapor from the fuel tank 12 is continuously routed to the canister 16 and, during engine operation, the stored vapor is purged therefrom via the conduits 26 and 28 to the air induction system.

Referring to FIGS. 2 and 3, the canister 16 generally comprises a cartridge housing 40 and a cover plate 42, both of which are formed from a suitable plastic material such as heat stabilized nylon. The housing 40 includes a downwardly depending cylindrical skirt 44 which is closed at its upper end by a circular top or end wall 46. The top wall 46 includes an outer upwardly projecting annular rim 48 and a centrally disposed funnel 50 which are interconnected by an annular grid 52 having a plurality of circular flow perforations. The funnel 50 includes a frustoconical wall 54 which converges downwardly and defines an inlet flow passage 56. The funnel 50 upwardly terminates at an annular shoulder 58. The interior surfaces of the skirt 44, the grid 52, and the outer surface of the wall 54 define a generally cylindrical downwardly opening adsorption chamber 60. The upper surfaces of the rim 48, the grid 52, and the shoulder 58 define an annular exhaust channel 62. In assembly, a pair of discardable vapor adsorbing cartridges 70, 72 are releasably retained within the adsorption chamber 60 by a retaining spring 74. The cartridges 70, 72 are resiliently biased apart by a compressed vapor distributing and filtering pad 76.

The cover plate 42 comprises a circular lid 80, a downwardly depending frustoconical nozzle 82 defining a chamber 83, and three upwardly and laterally extending fittings 84, 86, and 88. The fitting 84 is fluidly connected to the liquid vapor separator 14 by the conduit 24. The fitting 86 is fluidly connected to the carburetor 34 by the conduit 28. The fitting 88 is fluidly connected to the snorkel 30 by the conduit 36. The fittings 84, 86 each include central flow passages fluidly communicating the chamber 83. The fitting 86 further includes a restricting orifice 90 which maintains the flow through the conduit 28 at a low rate which will not materially affect the air-fuel ratio in the induction passage. The cover plate 42 further includes downwardly projecting annular shoulders 92, 94 which are disposed outwardly of the shoulders 58, 48 and serve to center the plate 42 with respect to the shell 44 with the nozzle 82 being coaxially disposed in the funnel 54. By suitable means such as bonding or sonic welding, the cover plate 42 is attached to the housing 40 to form an integral unit. In assembly, the flow passage of the fitting 88 will fluidly communicate with the exhaust channel 62 and through the perforated grid 52 with the adsorption chamber 60. Additionally, suitable means are provided for fixedly mounting the canister 60 at a location on the vehicle body preferably within the engine compartment.

The upper or anti-surge cartridge 70 and the lower or storage cartridge 72 are coaxially disposed in vertical stacked relationship within the chamber 60. The cartridges 70, 72 respectively comprise a filtering media 96, 98 and a hollow cylindrical support core 100 and 102. Each filtering media is in the form of a continuous sheet which is wrapped around the exterior of the associated core to form a cylindrical roll having peripheral surfaces conforming to the adjacent surfaces of the adsorption chamber 60. The media preferably comprises a paper material which is filled with a finely grained vapor adsorbing particulate such as activated charcoal or carbon granules having a high capacity for adsorbing and retaining fuel vapor. Preferably, the media comprises 60 percent carbonaceous material by volume. With this carbon-filled construction, extremely fine particles may be used to thereby increase the exposed surface area of the media and increase the adsorbing capabilities of the canister.

In assembly, the core 70 is disposed over the nozzle 54 thereby defining a closed flow path to the upper surface of the pad 76. The lower cartridge 72 is identical in construction with the exception that the core 102 includes a circular disc 106 which blocks the flow passage through the core 102 to prevent direct exhausting of the vapor to atmosphere. Thus, the entering fuel vapor flows axially and radially through the generally annular passage between the cores 100, 102.

As shown in FIGS. 2 and 4, the retaining spring 74 directly engages the lower surface of the storage cartridge 72 for releasably holding the cartridges 70 and 72 within the chamber 60. The pad 76, which is preferably a reticulated polyester urethane foam, is in the form of a circular disc and is slightly compressed in assembly to thereby resiliently bias the cartridges between the grid 52 and the spring 74. The spring 74 is generally triangular and has a pair of intersecting spring legs 110, 112, and a split releasing leg including sections 114, 116. The legs define successive apexes 118, 120, and 122 which are releasably received within complemental notches 124 formed in the lower portion of the shell 44.

In operation, the canister 16 continuously receives fuel vapors from the fuel tank 12 via the conduit 24. The vapor flows inwardly through the fitting 84 and downwardly through the chamber 83 to the pad 76. The vapor then flows radially outwardly through the pad 76. By gravitational forces and by the differential between the fuel vapor pressure and the atmospheric pressure at the open end of the chamber 60, the vapor flows downwardly into the media 98 of the storage cartridge 72. Upon contact with the adsorbing media, the vapor is adsorbed and retained by the particles. In this connection, it will be apparent that the requisite vapor flow pattern to the media may be obtained with a single cartridge by providing flow ports directly in the core as by a series of perforations.

During engine operation, a purge vacuum is created in the air induction system which applies a purging vacuum to the channel 62. The vacuum draws air through the storage cartridge 72 thereby purging the stored vapor upwardly to the anti-surge roll 70. The media in the anti-surge roll 70 serves to disperse the vapor and adsorbs the excess flow restricted by the orifice to thereby smooth out the flow of vaporized fuel and prevent a surge of fuel to the induction passage which would adversely affect engine operation by upsetting the air-fuel ratio. After the stored vapors have been purged, the engine vacuum is applied to the chamber 83 through fitting 86 and will directly purge the chamber 83. In this manner, the stored fuel is gradually and smoothly metered to the air induction system. During purging, the filtering pad 76 will additionally prevent dust and foreign particulate matter from entering the engine.

Thus, it will be seen the canister 16 effectively stores emitted fuel vapor for ultimate release to the engine. At specific recommended intervals or upon degrading of the adsorptive material, the cartridges 70 and 72 may be directly replaced by removal of the spring 74 without interrupting the fluid connections.

Although only one form of this invention has been shown and described, other forms will be readily apparent to those skilled in the art. Therefore, it is not intended to limit the scope of this invention by the embodiments selected for the purpose of this disclosure but only by the claims which follow.

I claim:

1. In a motor vehicle having a fuel reservoir and an internal combustion engine with an induction passage, a canister for controlling the loss of fuel vapor from said fuel reservoir comprising: a housing having a cylindrical adsorption chamber defined by a cylindrical side wall and an annular end wall; vapor inlet means connected to a central portion of said end wall; air inlet means in said end wall fluidly communicating with said adsorption chamber, said vapor inlet means adapted for fluid connection to the fuel reservoir and said vapor outlet means adapted for fluid connection with the induction passage; a fuel vapor adsorbing cartridge in said chamber including a core member and a fuel vapor adsorbing sheet filled with a finely particulated carbonaceous material which readily adsorbs fuel vapor, said sheet being wrapped around said core member to form a cylindrical shape substantially conforming to said adsorption connected to said vapor inlet means and said vapor adsorbing sheet being fluidly connected to said vapor outlet means; and means fluidly connected with said central passage for dispersing fluid vapor from said core to said sheet whereby fuel vapor from said reservoir flows through said core member and said dispersing means for storage in said carbonaceous material and for release therefrom during engine operation to the induction passage of the engine.

2. In a motor vehicle having a fuel reservoir and an internal combustion engine with an induction passage, a canister for controlling the loss of fuel vapor from the fuel reservoir comprising: a housing having a cylindrical side wall closed at its upper end by an upper annular end wall and open at its lower end, said side wall and said end wall defining a downwardly opening cylindrical adsorption chamber open to atmosphere; vapor adsorbing cartridge means supported in said adsorption chamber including an upper element positioned adjacent said end wall and a lower element positioned adjacent said lower end; fastening means releasably connected to said lower end supporting said elements within said adsorption chamber; a porous resilient vapor distributing pad compressed between said elements and biasing said elements between said end wall and said fastening means; each of said elements including a central core member and a fuel vapor adsorbing sheet wrapped around said core member to a cylindrical shape substantially conforming to said adsorption chamber, said sheet being filed with finely particulated activated charcoal having a high capacity for adsorbing fuel vapors, the core member of said upper element having a central passageway fluidly communicating with said distributing pad; a fuel vapor inlet passage in the center portion of said end wall adapted for fluid connection with the fuel reservoir, said inlet passage fluidly communicating with said central passageway to form a fluid path from the fuel reservoir to said adsorption chamber whereby fuel vapor flows to said distributing pad and downwardly therefrom for storage in said lower element; and a vapor outlet passage in the end wall adapted for fluid connection with the induction passage, said outlet passage fluid communicating with said adsorption chamber adjacent said upper element whereby the purging vacuum established in the induction passage during engine operation draws air through said adsorption chamber to purge stored fuel vapor from said lower element through said distributing pad to said upper element for dispersion therewithin and gradual purging therefrom to said induction passage.

3. In a motor vehicle having a fuel reservoir and an internal combustion engine including an air intake and a carburetor with an induction passage, a canister for controlling the loss of fuel vapor from the fuel reservoir comprising: a molded plastic housing having a cylindrical side wall, an annular end wall intersecting said side wall at its upper end, said side wall forming an opening to atmosphere; a downwardly opening cylindrical adsorption chamber formed by the inner surfaces of said side wall and said end wall; a first discardable vapor adsorbing cartridge positioned in said chamber adjacent said end wall; a second discardable vapor adsorbing cartridge positioned in said chamber below said first cartridge and registering with said opening; a porous polyurethane vapor distributing and filtering pad disposed between said cartridges; spring fastening means releasably connected to said lower end and engaging the second cartridge thereby compressing said pad and biasing said cartridges between said end wall and said spring fastening means, said cartridges including a cylindrical core and a fuel vapor adsorbing sheet wrapped around said core to form a cylindrical roll substantially conforming to said adsorption chamber, each of said sheets being filled with a vapor adsorbing material comprising substantially 60 percent activated charcoal by volume, the core of said first cartridge having a central passageway fluidly communicating with said pad; a fuel vapor inlet passage in the center portion of said end wall adapted for fluid connection with the fuel reservoir, said inlet passage registering with said central passageway to form a fluid path from the fuel reservoir to said adsorption chamber whereby fuel vapor flows to said pad and downwardly therefrom for storage in said second cartridge; and a first vapor outlet passage in said end wall including an annular chamber having a plurality of ports fluidly communicating with said adsorption chamber adjacent said upper element, said first vapor outlet passage adapted for fluid connection with the air intake whereby the purging vacuum established in the induction passage during engine operation draws air upwardly through said second cartridge to purge vapor stored therein through said pad to the first cartridge for dispersion therewithin and gradual purging through said first vapor outlet passage to said air intake; a second vapor outlet passage formed in said center portion of said end wall and registering with the central passageway of the core member of said first cartridge, said second vapor passage adapted to the fluidly connected to said induction passage thereby forming a flow path between the fluid reservoir and the induction passage for directly purging the fuel reservoir during engine operation.

* * * * *

PO-1050
(5/69)

UNITED STATES PATENT OFFICE
CERTIFICATE OF CORRECTION

Patent No. 3,730,158          Dated May 1, 1973

Inventor(s) James C. St. Amand

It is certified that error appears in the above-identified patent and that said Letters Patent are hereby corrected as shown below:

Column 4, line 45, after "adsorption" insert -- chamber, said core member having a central passage fluidly --.

Column 5, line 8, delete "filed" and substitute therefor -- filled --.

Column 6, line 37, delete "the" and substitute therefor -- be --.

Signed and sealed this 12th day of March 1974.

(SEAL)
Attest:

EDWARD M. FLETCHER, JR.                    C. MARSHALL DANN
Attesting Officer                            Commissioner of Patents